United States Patent
Cich

[15] 3,655,452
[45] Apr. 11, 1972

[54] BUTTON CELL BATTERY

[72] Inventor: Everett Roy Cich, Monona, Wis.

[73] Assignee: ESB Incorporated

[22] Filed: June 25, 1970

[21] Appl. No.: 49,661

[52] U.S. Cl. .................................... 136/111, 136/173
[51] Int. Cl. ........................................... H01m 21/00
[58] Field of Search ............... 136/111, 108, 175, 133, 107, 136/134, 171–173

[56] References Cited

UNITED STATES PATENTS

| | | |
|---|---|---|
| 3,056,850 | 10/1962 | Rauske et al. ...................... 136/173 |
| 2,702,310 | 2/1955 | Kaye et al. ......................... 136/111 |
| 2,667,527 | 1/1954 | Pucher ............................. 136/111 X |
| 2,547,262 | 4/1951 | Greenstein ......................... 136/108 |
| 2,751,427 | 6/1956 | Woodring ........................... 136/111 |
| 3,347,709 | 10/1967 | Taylor et al. ....................... 136/108 |

*Primary Examiner*—Anthony Skapars
*Attorney*—Alfred J. Snyder, Jr., Robert H. Robinson, Raymond L. Balfour and Anthony J. Rossi

[57] ABSTRACT

A button cell battery assembly is shown in which the button cells, in planar array, are electrically connected by pressure contact.

5 Claims, 5 Drawing Figures

INVENTOR.
EVERETT ROY CICH

INVENTOR.
EVERETT ROY CICH

BUTTON CELL BATTERY

BACKGROUND OF THE INVENTION

1. Field of the Invention

This invention relates to multi-cell batteries made up of a number of dry cells of the "button" variety. The battery is characterized by having the cells in a planar array so that the entire battery is little thicker than the individual button cells from which it is built.

2. Description of Prior Art

In the dry cell industry, coloquial names have been given to many of the various shapes and sizes of battery. The name "button cell" has been attached to a series of small, more or less disc-shaped cells having a diameter usually greater than the height and having capacities ranging in the main from perhaps 2 milliampere hours to as much as 2,000 MAH. Several electrochemical couples have been used in the button assemblies among the more prominent of which are the mercuric oxide-zinc couple and the nickel cadmium couple. Button cells have wide use in hearing aids, miniature radios, instruments, light meters, etc.

Button cell batteries are normally built as a pile with one cell placed on top of the preceding one and with a single outside clamping member serving to form and maintain the electrical contact between the several cells. This construction is extremely compact and is the normally desirable way to build a button cell battery. The battery is of necessity a cylindrical or, if boxed, a square, prismatic shape. There are cases where this shape is not the most convenient for the battery user and where a rather thin rectangular shape would be more desirable. Further, the pile arrangement has its contacts at the two ends, requiring some form of spring clamp for making electrical contact. Because of this, the pile type battery is usually mounted within the battery operated device. If, by chance, an internally located battery should leak, there would be considerable likelihood that parts of the internal structure of the device might become corroded. Therefore, there is a need for a button cell battery of a more or less rectangular shape having one dimension less than the other two dimensions, mounted in a weatherproof pack and suitable for external attachment to the appliance on which it is to be used.

SUMMARY OF THE INVENTION

This invention discloses a button cell battery with cells assembled in planar array in a rectangular prismatic container having terminals issuing from the battery on one side and having internal intercell connections made by pressure contact.

DESCRIPTION OF THE PREFERRED EMBODIMENTS

Figure 1:
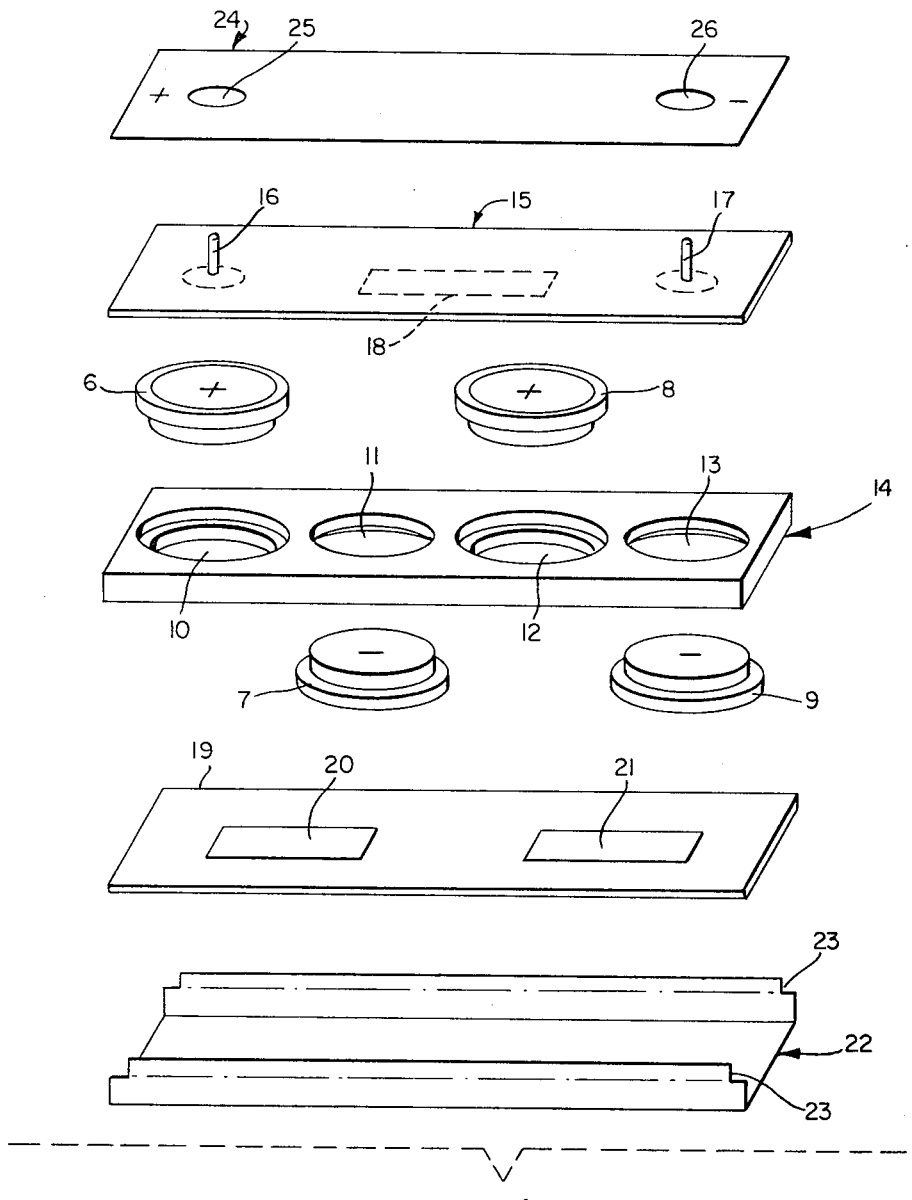
FIG. 1 shows an expanded view of the parts for a four cell battery.

Referring to FIGS 1, 6, 7, 8 and 9 represent four button cells from which a battery is to be assembled. It is to be noted that cells 6 and 8 have the positive terminal facing up and that cells 7 and 9 have their negative terminal facing up. This is to provide a series connected battery for maximum voltage. A center insulating piece 14 of electrically insulating material has four holes 11, 12, 13 and 14 shaped to take the four cells. This center insulating piece is approximately the same thickness as the cells. A top insulating piece 15 carries positive terminal 16, negative terminal 17 and intercell connector 18 mounted thereon. The intercell connector 18 is located on the underside of the upper battery insulating means 14. A bottom insulating piece 19 has intercell connections 20 and 21 mounted thereon. Terminal pieces 16 and 17, which will contact cells 6 and 9 respectively on assembly, penetrate through the top insulating piece 15 to provide electrical terminal contacts outside of the battery proper. A metal case 22 having one or more deformable ears 23, and a metal cover 24 having clearance holes 25 and 26 for terminals 16 and 17 complete the parts of the battery. The battery is assembled as a sandwich of the three insulating pieces 19, 14 and 15 with the cells 6, 7, 8 and 9 mounted in the holes of the center insulating piece 14. This assembly is placed in container 22, cover 24 is placed on top and the entire assembly is placed in a press and clamped tightly. The ears 23 are thereby bent down onto cover 24 serving to preserve the clamping pressure after the assembly has been removed from the press.

Figure 2:
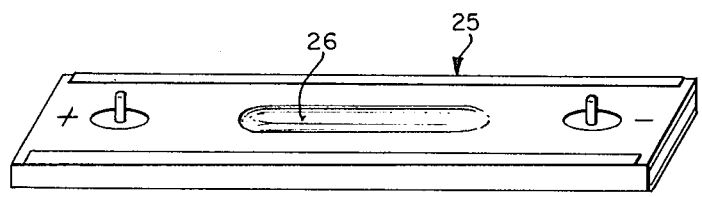
FIG. 2 shows an assembled battery of first alternate design.

It has been found that the construction shown in FIG. 1 can be improved by forming an upset or depressed groove in the metal of cover 24 and the can 22 along the centerline over the intercell connectors. This serves to concentrate the clamping pressure on the contact areas of cell and intercell connector. FIG. 2 shows such a construction. In FIGS. 2, 25 represents the battery and 26 an upset area or recessed groove along the centerline of its top, over the top intercell connector 18 (not shown in this view). A similar upset area or recessed groove in the bottom piece (22 FIG. 1) is provided.

Figure 3:
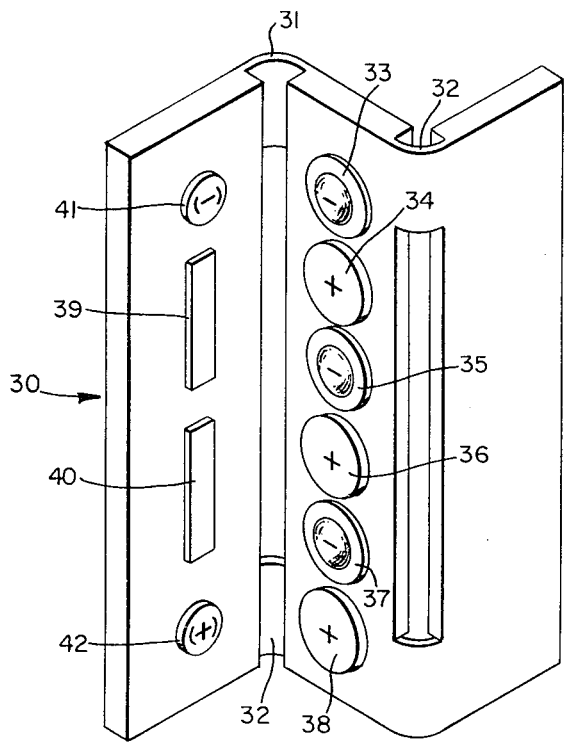
FIG. 3 shows a view of an alternate construction of the internal parts.

FIG. 3 shows an alternate design in which the three insulating pieces are now a single molding 30 having hinge sections 31 and 32 to permit folding into the final shape required by the battery. The hinge sections comprise a web having a thickness less than that of the cell positioning means. Six cells 33, 34, 35, 37 and 38 are shown in this battery. Two metallic intercell connectors are shown at 39 and 40. The terminal cell contacts are shown at 41 and 42.

Figure 4:
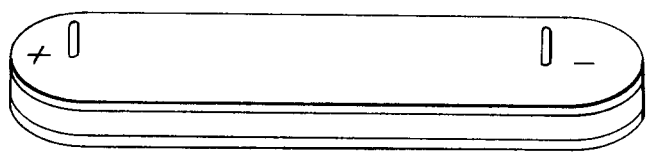
FIG. 4 shows an assembled battery of a second alternate design.

FIG. 4 shows a second alternate design in which the plastic parts are cemented together thus eliminating the external metal can and effectively sealing the battery against ingress of moisture. In the case of this battery, the ends have been rounded for asthetic reasons.

Figure 5:
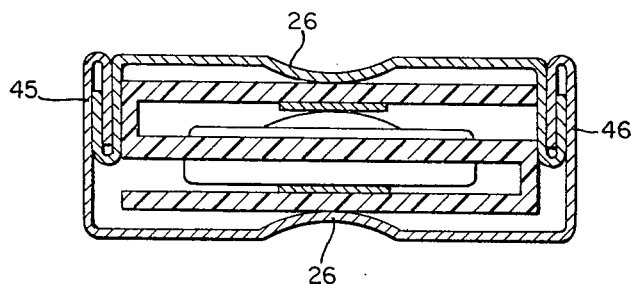
FIG 5 shows a cross section of still another alternate design.

FIG. 5 shows a cross section view of another variation in which the metal clamping pieces are fastened together by a folded joint shown at 45 and 46.

A further alternate is to have the outside clamping members form a complete battery enclosure sealed if need be with sealant materials.

The material from which the insulating members used in this invention are made is not critical. For low cost batteries, materials such as cardboard, inpregnated cardboard, vulcanized fiber, etc. will be suitable. For better grade batteries, the entire gamut of thermoplastic and thermoset materials is available to the battery designer, limited only by the resistance to cold flow of the material. In the case of the embodiment shown in FIG. 3, a flexible material, suitable for manufacture by extrusion or injection molding, such as polyethylene or polypropylene would be desirable. In the case of the embodiment shown in FIG. 4, a cementable material such as polystyrene, polyvinyl chloride or methylmethacrylate would be used.

Devices other than the friction fit at the contacts for holding the battery to the appliance are considered to be within the realm of this disclosure, as well as other arrangements of clamping pieces, insulating pieces as covered by the general description of this invention.

In the above five examples, the batteries have had an even number of cells. If an odd number of cells had been desired, it would be necessary to have one terminal passing from the bottom of the last cell through the insulating center piece and the insulating top piece.

It may be desirable to connect all cells in parallel to give maximum current capability rather than in series for maximum voltage. In this case, all cells are placed with the same terminal in the up position and a single intercell connector run along the top insulating piece and a second along the bottom.

Alternately, it may be desirable to connect cells in a series-parallel array. This, too, can be accomplished by suitable choice of intercell connections and suitable orientation of the several cells.

It is to be noted that in all the batteries described, the individual cells are arranged so that cell tops and bottoms lie approximately on one or the other of two plane surfaces so that the battery will have a minimum height dimension. For purposes of definition, this is called a planar array of the cells and serves to distinguish the cell assembly from the pile type where cells are located one above the other.

Having fully described my invention, I claim:

1. In a multicell battery comprised of button cells having the button cells in a planar array, the improvement comprising:
   a. cell positioning means of non-conductive material, the positioning means having a thickness approximately equal to the thickness of the button cells and having holes therethrough in which the cells are located;
   b. an upper battery insulating means including intercell connector means and terminal means, the upper battery insulating means being positioned above the cell positioning means, the intercell connecting means located on the underside of the upper battery insulating means and the terminal means penetrating therethrough, the upper battery insulating means being attached to the cell positioning means by web means, the web means having a thickness less than the cell positioning means, the web means forming hinge means between the cell positioning means and the upper battery positioning means;
   c. a lower battery insulating means including intercell connector means, the lower battery insulating means being positioned below the cell positioning means the lower battery insulating means being attached to the cell positioning means by web means, the web means having a thickness less than that of the cell positioning means, the web means forming hinge means between the cell positioning means and the lower battery positioning means; and,
   d. clamping means for applying a clamping force between the top and bottom battery insulating means.

2. A multi-cell battery as defined in claim 1 in which the clamping means comprises external metallic members.

3. A multi-cell battery as defined in claim 2 in which the clamping means applies the clamping force along the center line of the intercell connector means.

4. A multi-cell battery as defined in claim in which the means for applying a force between the upper and lower insulating means is provided by adhering the upper insulating means and the lower insulating means to the cell positioning means.

5. In a multicell battery comprising button cells positioned in planar array, cell positioning means of non-conductive material, an upper battery insulating means including intercell connector means mounted thereon and terminal means and a lower battery insulating means including intercell connector means mounted thereon, the improvement which comprises:
   a. an upper metallic cover located on top of the upper battery insulating means and having a recessed groove therein located along the centerline of the intercell connector means mounted on the upper battery insulating means;
   b. a lower metallic bottom piece located below the lower insulating means and having recessed groove therein located along the centerline of the intercell connector means located on the lower battery insulating means; and
   c. clamping means applying clamping pressure between the upper metallic cover and the lower metallic bottom piece.

* * * * *